United States Patent
Clayton (10) Patent No.: US 10,261,503 B2
(45) Date of Patent: *Apr. 16, 2019

(54) WIRELESS DEVICES, SYSTEMS, ARCHITECTURES, NETWORKS AND METHODS FOR BUILDING AUTOMATION AND CONTROL AND OTHER APPLICATIONS

(71) Applicant: Autani, LLC, Columbia, MD (US)

(72) Inventor: Randy Clayton, Columbia, MD (US)

(73) Assignee: Autani, LLC, Columbia, MD (US)

( * ) Notice: Subject to any disclaimer, the term of this patent is extended or adjusted under 35 U.S.C. 154(b) by 230 days.

This patent is subject to a terminal disclaimer.

(21) Appl. No.: 15/448,851

(22) Filed: Mar. 3, 2017

(65) Prior Publication Data
US 2017/0205812 A1    Jul. 20, 2017

Related U.S. Application Data

(63) Continuation of application No. 13/649,096, filed on Oct. 10, 2012, now Pat. No. 9,588,506.

(60) Provisional application No. 61/545,578, filed on Oct. 10, 2011.

(51) Int. Cl.
| | |
|---|---|
| G05B 15/02 | (2006.01) |
| H04B 7/145 | (2006.01) |
| H04W 24/08 | (2009.01) |
| G05B 19/418 | (2006.01) |

(52) U.S. Cl.
CPC ....... G05B 19/41855 (2013.01); G05B 15/02 (2013.01); H04B 7/145 (2013.01); H04W 24/08 (2013.01); G05B 2219/2642 (2013.01)

(58) Field of Classification Search
CPC .............. G05B 19/41855; G05B 15/02; G05B 2219/2642; H04W 24/08; H04B 7/145
USPC ............................................ 700/19, 286–298
See application file for complete search history.

(56) References Cited

U.S. PATENT DOCUMENTS

| | | | |
|---|---|---|---|
| 8,275,471 B2 | 9/2012 | Huizenga | |
| 8,429,435 B1 | 4/2013 | Clayton | |
| 8,548,607 B1 | 10/2013 | Belz | |
| 8,581,439 B1 | 11/2013 | Clayton | |
| 2003/0199247 A1* | 10/2003 | Striemer | H04B 7/155 455/11.1 |
| 2005/0097618 A1 | 5/2005 | Arling | |
| 2005/0168326 A1 | 8/2005 | White | |
| 2005/0272372 A1* | 12/2005 | Rodriguez | H04L 12/2803 455/66.1 |
| 2006/0132303 A1 | 6/2006 | Stilp | |
| 2007/0293208 A1 | 12/2007 | Loh | |
| 2008/0183307 A1 | 7/2008 | Clayton | |

(Continued)

Primary Examiner — Ziaul Karim
(74) Attorney, Agent, or Firm — Luedeka Neely Group, P.C.

(57) ABSTRACT

A building control and management system including an automation controller and a plurality of peripheral devices configured to perform building control-management system functions. The automation controller and peripheral devices communicate wirelessly and the peripheral devices may be enabled and disabled as wireless repeaters in a network formed by the automation controller and the peripheral devices. The automation controller may monitor the communication traffic levels in the wireless network and enable or disable peripheral devices as wireless repeaters to increase or decrease the communication traffic in the network.

19 Claims, 9 Drawing Sheets

(56) References Cited

U.S. PATENT DOCUMENTS

| | | |
|---|---|---|
| 2008/0217418 A1 | 9/2008 | Helt |
| 2009/0067441 A1 | 3/2009 | Ansari |
| 2011/0111700 A1 | 5/2011 | Hackett |
| 2011/0199959 A1* | 8/2011 | Fukuzawa ............ H04W 48/20 370/315 |
| 2012/0080944 A1 | 4/2012 | Recker |

* cited by examiner

WIRELESS DEVICES, SYSTEMS, ARCHITECTURES, NETWORKS AND METHODS FOR BUILDING AUTOMATION AND CONTROL AND OTHER APPLICATIONS

CROSS-REFERENCE TO RELATED APPLICATIONS

This application is a continuation in part of U.S. patent application Ser. No. 13/649,096 filed Oct. 10, 2012, which claims the benefit of U.S. Provisional Patent Application No. 61/545,578 filed Oct. 10, 2011, both of which are incorporated herein by reference.

STATEMENT REGARDING FEDERALLY-SPONSORED RESEARCH AND DEVELOPMENT

Not Applicable.

FIELD OF THE INVENTION

The present invention is directed generally to wireless automation and control systems and, more specifically, to wireless automation and control systems, devices, networks, and methods that provide for more reliable and efficient systems and networks.

BACKGROUND OF THE INVENTION

Automation of the work and leisure environment has been a concept that has been long pursued. Despite the continued pursuit, widespread automated control has been limited.

In non-residential buildings, whether it is for or non-profit, academic, governmental, social, etc., owners and tenants face challenges similar to those in the residential market. Non-residential energy consumers can employ highly sophisticated systems for controlling their heating, ventilation, and air conditioning ("HVAC"), as well as for access control and information technology. Otherwise, these consumers are also generally limited to the use of programmable thermostats and motion controlled lighting.

These unmanaged, distributed control systems provide little to no visibility into energy consumption patterns. The lack of visibility makes it difficult to modify or tailor consumption patterns to reduce the energy consumed or the cost of the energy being consumed. Furthermore, participation in utility based conservation programs, such as demand-response programs, is typically limited to those residential and non-residential facilities that can operate with periodic interruptions of their air conditioning systems.

With the development of managed systems, the performance of the system is increasingly dependent on the reliability of the devices and networks in the system. Reliability and scalability issues with managed systems can significantly impact the value and usability of these systems.

As such, there is a continuing need for more reliable and scalable wireless automation systems, devices, networks, and methods that overcome the various limitations associated with prior art solutions to enable high quality, cost effective, and scalable automation solutions for buildings.

BRIEF SUMMARY OF THE INVENTION

The present invention provides, among other things, systems, devices, software, and methods that enable more reliable and scalable wireless automation and control systems for inside and outside buildings. Systems may include one or more automation controllers monitoring and controlling a plurality of peripheral devices configured to perform various building and property control and networking functions. The automation controller and peripheral devices communicate wirelessly and, in addition, the peripheral devices may be enabled and disabled as wireless repeaters in a network formed by the automation controller and the peripheral devices to receive and retransmit communication signals from other peripheral device in the network. The automation controller may monitor the communication traffic levels in the wireless network and enable or disable peripheral devices as wireless repeaters to increase or decrease the communication traffic in the network.

The present invention addresses limitations of the prior art as will become apparent from the specification and drawings.

BRIEF DESCRIPTION OF THE SEVERAL VIEWS OF THE DRAWING

The accompanying drawings are included for the purpose of exemplary illustration of various aspects of the present invention, and not for purposes of limiting the invention, wherein:

FIGS. 1-2b show embodiments of wireless automation and control systems and networks.

It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Figure 1:
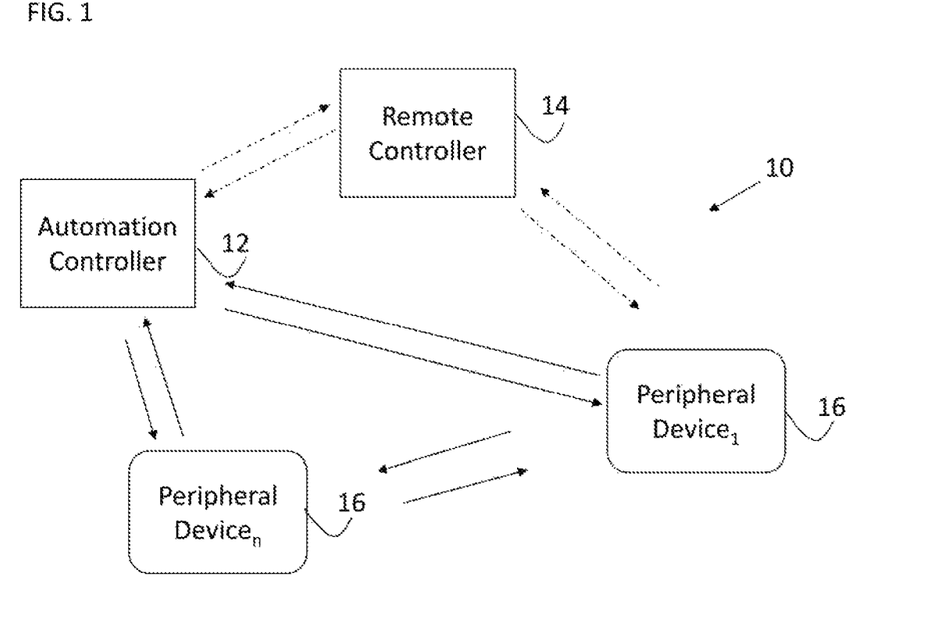

FIG. 1 depicts various automation system 10 embodiments of the present invention may include various components, such as an automation controller 12, a remote controller 14, and one or more peripheral devices $16_{1-n}$. The remote controller 14, if employed, may have one or two way communications (as indicated by the dashed arrows) with the automation controller 12 and/or peripheral devices $16_{1-n}$.

Communication between the automation controller 12 and the peripheral devices $16_{1-n}$ may be wired and/or wireless depending upon the particular implementation. Wired communication may make use of the power lines, local area networks, or direct links between communication ports, such as USB, RS-232 and 485, etc. Wireless communications may employ one or more wireless technologies, such as Zigbee, Z-wave, Bluetooth, and/or other proprietary and/or open standard, e.g., IEEE 802.x, communication protocols transmitting signals in the infrared and/or radio frequency spectrum. As mentioned above, Zigbee and Z-wave are protocols that have been developed specifically for applications, such as automation, control, telemetry, etc., where some of the devices used in the system, such as those operating on battery power, may require low power, reliable, non-line of sight communication.

Figure 2A:
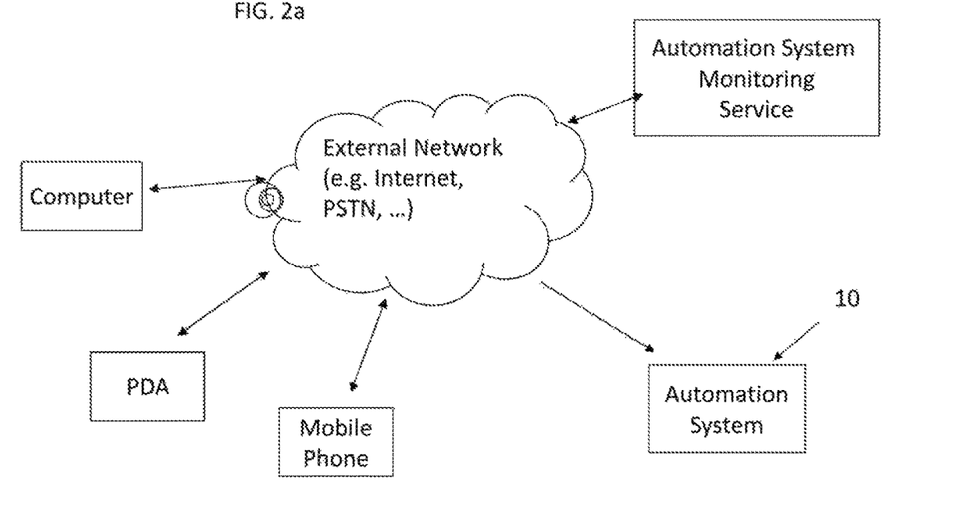

FIG. 2a shows system 10 embodiments that include connectivity to various input, output, and monitoring devices ("input/output devices") via an external network, such as the Internet, PSTN, etc. Access to the system 10 may be enabled from a variety of devices, such as computers, mobile and fixed phone lines, personal digital assistants (PDA), etc., as well as from third party service provider networks for system monitoring and control. For example, a computer may communicate directly with the automation controller 12 or via one or more networks including personal, local, metro, and wide area, public and private, intranet and internet networks. Access via the external network provides the end user with the capability to monitor and configure the system 10 remotely. For example, it may be desirable to change the temperature in the house before returning home, or to receive a text message letting you know that some event, such as a door opening, a smoke or CO detector sounding, tagged item/mobile device moving across a threshold, etc.

Figure 2B:
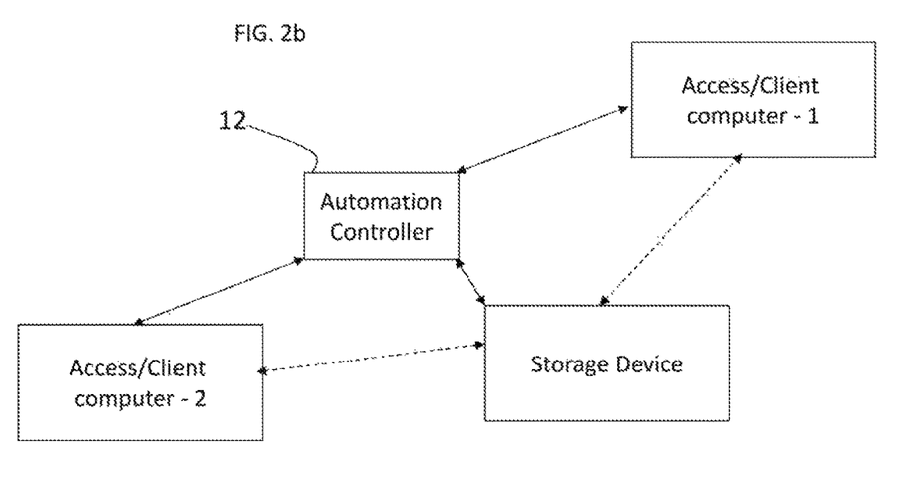

As shown in FIG. 2b, the automation controller 12 also may be deployed in client-server architectures, in which one or more computers, acting as clients, provide data entry and access to the controller 12. The client may also interact with storage devices supporting data storage for the system 10 either directly or via the automation controller 12. As previously described, the automation controller 12 functionality may be distributed among a number of automation controllers 12 with oversight from a master controller 12, which may further include client computers for data entry and access. Additional devices also may be employed to provide additional functionality or robustness to the system. For example, storage devices may be employed to off-load data collected by the automation controller 12. Access to the storage devices may be achieved via the automation controller 12 and/or directly by another computer, which may provide analysis capability off-line from the automation controller 12.

In various embodiments in which data is stored in a device external to the automation controller 12, it may be desirable to enable various software applications on the client computers to enable analysis and planning activities to be performed without burdening the automation controller 12. For example, client computers may run planning and analysis software tools that enable the user view detailed and consolidated usage information. Planning activities, such as evaluating the impact of varying operational hours or replacing various electrical systems may be investigated using historical data from the system 10.

Figure 3:
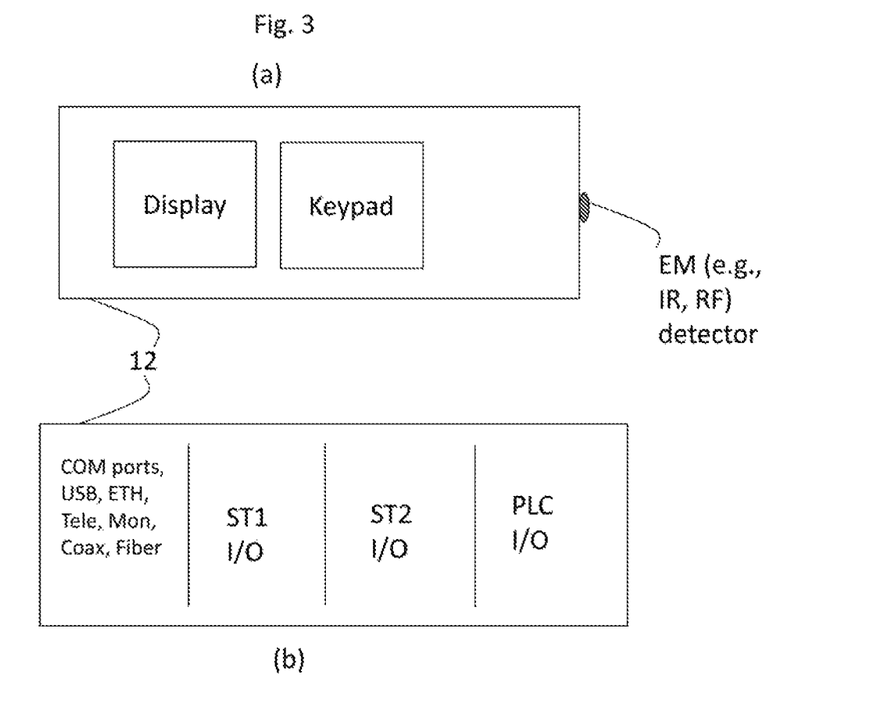
FIGS. 3a-b show embodiments of automation controller.

FIGS. 3a and 3b depict various embodiments of the automation controller 12. In many system 10 embodiments, the automation controller 12 may provide system oversight, coordination, and control of the peripheral devices 16 and, if present, the remote controller 14. Access to the automation controller 12 may be provided internally by the controller and/or external to the controller. In various embodiments, the automation controller 12 may be fully autonomous with data entry and access capabilities provided directly on it. In other embodiments, data entry and access to the automation controller 12 may be completely external.

As shown in FIG. 3a, the automation controller 12 may include a keypad and/or a visual display to enter and view information. In various embodiments, a touch screen interface may be included to combine the data entry and viewing functionality. In other embodiments the data entry and viewing functionality may be provided outside of the automation controller 12 via a monitor and/or television screen with data entry via the remote controller 14 or support a display and keypad similar to a stand-alone computer.

The front of the automation controller 12 may also include an IR detector for those embodiments that support receiving IR signals. In those embodiments, the IR transmission capability of the remote controller 14 may be employed to control the automation controller 12, instead of using the RF transmission link. Also, the automation controller 12 may support the use of a more traditional remote that transmits only using IR signals.

FIG. 3b depicts an exemplary back view of the automation controller 12. It may generally include a variety of communication ports and transmitters and receivers for the various transmission protocols that are supported. For example, telephone, Ethernet, coax, and/or fiber connections may be provided. USB, RS-232 and 485 and other access ports and monitor connections. Transmitters and receivers for the various wireless transmission protocols are also included. For example, a Zigbee or Z-wave transmitter and receiver may support a first signal type ($ST_1$) and one or more 802.x transmitters and receivers may support networking via a second signal type ($ST_2$). In various embodiments, the automation controller 12 will also include an interface to support power line communications with peripheral devices 16 that communicate via power line protocols, such as X10.

In addition to the input/output and networking connections and associated hardware and software interfaces, the automation controller 12 may generally include one or more storage devices, as well as one or more processors, depending upon the particular capability being implemented on a particular automation controller 12 embodiment. In general, the automation controller 12 may provide most monitoring, coordination, control, and record keeping functions for the system 10. The desired system size and capabilities may drive the level of functionality embodied in the automation controller 12.

The automation controller 12 may typically connect to external power. The automation controller 12 may also include a battery back-up, in case of an external power failure, depending upon the level of reliability desired. While the automation controller 12 may be operated on battery power only, the functionality of the controller 12 generally warrants a continuously available (excepting failures) power source.

While varying levels of functionality may be embodied in the remote controller 14, in many embodiments, the full features and functionality of the system 10 are typically accessible and controllable via the automation controller 12. The automation controller 12 may generally provide menu-driven access to control the peripheral devices 16. The capability to check, change and schedule a change in status and/or settings for the peripheral devices 16 may be generally provided. The automation controller 12 generally stores the system inventory and settings and may also be configured to store that information externally, such as in a computer or mass storage device, or at an off-site network operations center. The back-up of system information may be performed manually or automatically.

Discovery and association of automation controllers 12, remote controllers 14 and peripheral devices 16 with the automation controller 12 and/or remote controller 14 may be a manual, automatic, or semi-automatic process. In some embodiments, the automation controller 12 may scan its operational range to discover various system components including other automation controllers 12, remote controllers 14 and peripheral devices 16 with which it may be associated. The automation controller 12 may update its potential inventory list each time it detects a new components.

As part of the discovery process, the automation controller 12 may employ various discovery methods. For example, it may "ping" all the components in its transmission range to send discovery information to the automation controller 12 to ensure a timely and complete inventory is established. The automation controller 12 may also "listen" for signals from components in its reception range, which may be compared to its inventory lists derived from pinging or otherwise. The automation controller 12 may be configured to continue discovery via pinging, listening, or otherwise until a consistent inventory list is produced. Alternatively, it may provide an inventory list of components that may be confirmed via multiple discovery methods, which may be used to define its operational range. It may also identify components that were discovered using one method, but not confirmed via another method. For example, a component that the automation controller 12 discovers by listening, but it does not respond to a ping signal sent by the automation controller 12. In this example, the component may be within the reception range of the automation controller 12, but not the transmission range for one or more reasons, such as shielding, partial component failure, etc.

Association of the peripheral devices 16 and remote controllers 14 with the automation controller 12 may be performed automatically as part of the inventory process. However, it is often times more desirable, even though it is more work, to have the association process be separate from inventory to ensure that only desired associations are made.

The association procedure for components with the system 10 may involve interaction between the component and the controller as part of the procedure and/or the user may associate the component. The procedure may be limited to adding a component identifier/address to a system database or may be more involved, such as configuring the component to assume particular operational states and/or roles in the network following the association.

In some instances, it may be desirable to require interaction between the component and the controller to minimize the chances of an improper association. For example, the peripheral devices 16 and remote controllers 14 may have an associate button, switch, key, etc., that must be activated during association. Alternatively, each device may have an association code or device identifier, such as a MAC address, that is entered via the automation controller 12 and/or the remote controller 14 as part of the association process without requiring communication between the controller and the component. The component may then respond to any controller that uses the proper address.

In various embodiments, a remote controller 14 may be used to initiate and/or perform the association or commissioning process using line of sight communications, such IR, in lieu of or combination with non-line of sight communications, e.g., Zigbee. The use of line of sight communication significantly reduces the probability of a peripheral device or other component being associated with a wrong network in deployment scenarios where systems have overlapping operational ranges, such as in multi-tenant facilities, and does not require physical interaction with the components.

In an exemplary association process, the remote controller 14 is configured to provide a line of sight signal, i.e., an IR signal, to the peripheral device 16 placing it in an association mode, where it may become associated with the automation controller 12 and/or with the remote controller 14. In some instances, the peripheral device 16 may remain in an association state until an automation controller 12 and/or remote controller 14 detects its presence and completes the association process. The detection of the peripheral device 16 by the automation controller 12 may be initiated by the remote controller 14 and/or peripheral device 16. For example, the remote controller 14 may be configured to send an association signal to the automation controller 12, in addition to the peripheral device 16. In this example, it may be desirable for the remote controller 14 to send a code/key to the automation controller 12 and peripheral devices 16 that is used in the association process to prevent the inadvertent initiation of the association process with another automation controller 12 within the range. If the association process is not initiated on the automation controller 12 by the remote controller 14, it may be desirable for the remote controller 14 to provide a code/key to the peripheral device 16 for identification in the association process, when it is detected by the automation controller 12.

In embodiments without a remote controller 14, the automation controller 12 may be configured to associate only with peripheral devices 16 and/or other automation controllers 12 for which a physical address, such as a MAC address, or code/key has been entered into the automation controller 12. The automation controller 12 may also be configured to associate with new components when it is in an association mode as discussed above, as opposed to trying to associate automatically with any component it detects during operation.

In some embodiments, it may be desirable to associate a peripheral device with an automation controller 12, when the peripheral device is not present within the communication range of the automation controller 12. For example, it may be desirable to associate a peripheral device with multiple automation controllers 12 within one or different systems 10 that have non-overlapping ranges of operation. One such embodiment of non-overlapping ranges is described below with respect to geographically diverse systems that share peripheral devices 16. The association between peripheral devices 16 and automation controllers 12, whether present in the range or not, may be performed by either or both devices 16 and controllers, using identifiers and signaling prompts, as may be appropriate.

Peripheral devices 16 in the present invention are generally implemented in a function role communicating directly with remote controllers 14 and/or automation controllers 12 depending upon the system configuration and responding to their commands to perform a function, which may include one or more steps, processes, and/or actions. Common peripheral devices 16 include electrical wall and device receptacles and jacks, plug strips, plug heads, on/off, contact, and dimmer switches for lighting control and other system control, visual (e.g., motion), audio, material (smoke, humidity, CO, radiation, etc.), electromagnetic wave (RF, IR, UV, visible light, etc.), shock, and thermal sensors, thermostats, video equipment (e.g., cameras, monitors), audio equipment (e.g., microphones, speakers), blinds, fans, communication equipment used to provide services, such as plain old telephone service (POTS), voice over Internet Protocol (VoIP), video, audio, and data, etc.

The peripheral devices 16 may also be used to obtain data from other devices for evaluation, referred to herein as monitoring peripheral devices 16. For example, a sensor or other peripheral device 16 may configured to monitor signals output by a piece of equipment or other device and send the signals along with the notification of the signaling event. The signals may be error codes or other performance attributes in various forms, such as visual (flashing lights), audible (beeps), and/or electrical signals that are detected by the devices 16 and forwarded by the system 10 to the relevant parties, if desired. For example, light pattern changes on LEDs (flashing, color, etc.) on computer equipment may be converted to an error code for evaluation or the audible signal from a smoke detector may be evaluated to distinguish low battery alerts from actual smoke detection.

In various embodiments, peripheral device 16 may include a limited purpose remote controller that may be configured to send a generic automation instruction or a sequence of instructions to the automation controller 12 or the remote controller 14. Upon receiving the generic instruction, the controller may execute a reconfigurable instruction set controlling a group of one or more peripheral devices 16. In other embodiment the limited purpose remote controller may be reconfigured to perform different functions at different times as desired by the user, such as described below with regard to "scenes".

Data from monitoring peripheral devices 16 may be used as primary data or as data to corroborate data received from other peripheral devices 16 within the system 10. For example, when a smoke detector is embodied as a peripheral device 16 in the system 10, the system 10 may be configured such that the automation controller 12 receives a smoke detected alarm from the smoke detector peripheral device 16 and a corroborating alarm from an audible monitor peripheral device 16 that detected the smoke detector audible alarm.

The peripheral devices 16 may operate on external and/or battery power depending upon the requirements of a particular device and the accessibility of external power. For example, electrical receptacles may not be required to transmit and receive information frequently, so they may be operated on battery power. However, electrical receptacles are connected in an external power circuit, so those devices may generally be operated using external power, because it is available. Similarly, peripheral devices 16 that are communicating with the automation controller 12 via a power-line communication protocol may be configured generally to use external power as those devices may be connected by the external power lines. If the function of the peripheral devices 16 is something that should remain operational, even when there is an external power outage, then it may be desirable to provide battery power as the primary or secondary power source to the device.

The peripheral devices 16 may be controlled individually by the controllers or in groups to create "scenes" or to place a structure in a particular operational state, such as set the air and water temperatures, disabling/enabling the door alarms, turning on/off computer equipment and other electrical devices, and unlocking/locking the garage and other doors when a business opens/closes or a person leaves/returns to a residence.

In various embodiments, it may desirable to include one or more peripheral devices 16 packaged along with or proximate to the automation controller 12. The close proximity of the peripheral devices 16 to the automation controller 12 allows for a direct wired connection in lieu of, or in addition to, the communication scheme used with other peripheral devices 16. As such, the close proximity peripheral devices 16 may provide a low cost means for controlling devices, which are in close proximity to the automation controller 12. For example, in many cases, the automation controller 12 may be placed in close proximity to audio, video, and computer equipment, as well as lighting, which may be controlled via the low cost proximate peripheral devices 16. Similarly, two or more peripheral devices 16 being deployed in close proximity may be implemented as a peripheral device control group, which share a common communication interface (transmitters, receivers, etc.) to the controllers 12 and/or 14. The sharing of the communication interface, and in some instances, some or all of the processing capability, provides for lower cost peripheral devices 16. In various embodiments, each of the individual peripheral devices $16_{1-n}$ in the control group is identified as a separate peripheral device 16. Whereas, in other embodiments, the entire device 16 is identified as one peripheral device 16 with sub-devices $16_{1-n}$. The identification of the peripheral devices 16 as individual devices or sub-devices is generally left to the skilled artisan. When using sub-device identification, instructions may be given to the device as a whole, which may be left to the device itself to implement. For example, peripheral device 16 may be instructed to turn off, which causes the peripheral device 16 to turn off sub-devices $16_{1-n}$. In the individual device implementation, instructions to turn off are sent to each of the devices $16_{1-n}$ for action.

Figure 4A:
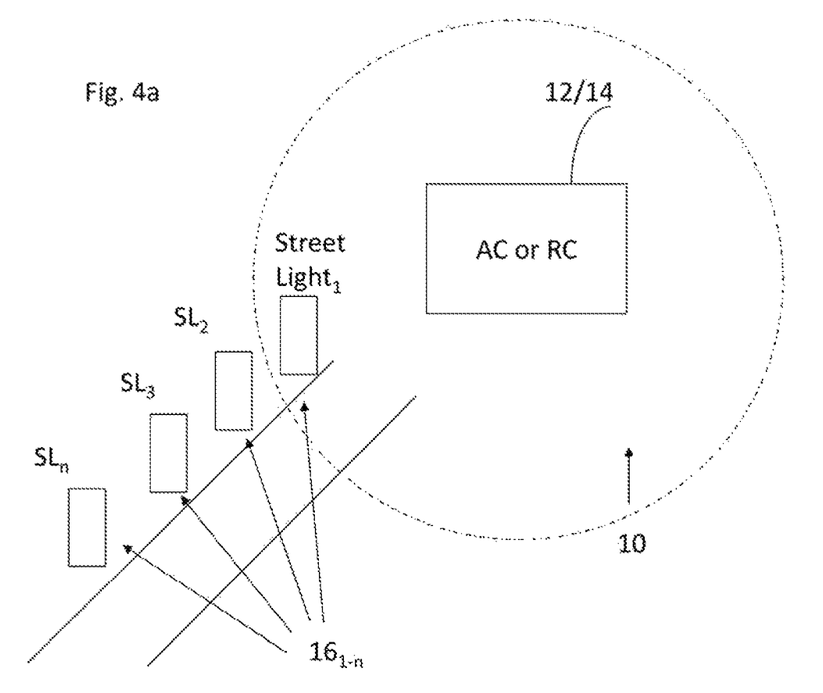
FIGS. 4-6 show embodiments of wireless automation and control systems and networks.

FIG. 4a shows other embodiments of the present invention. In these embodiments, one or more peripheral devices 16 may be located outside of the operational range (shown as a dashed line) of the automation controller 12 and/or the remote controller 14, such as devices $16_{2-n}$ in FIG. 4a, referred to as "outside devices". In these embodiment, the peripheral device $16_1$ may be configured to receive and transmit information to and from the outside devices $16_{2-n}$.

The relationship between the outside devices and the automation controller 12 may be implemented in various fashions, such as individual devices or sub-devices as discussed above. The outside devices may or may not be visible from an automation controller 12 inventory perspective. In various embodiments, the outside devices are visible to the automation controller 12 and are mapped based on their nearest neighbors in a mesh network topology and the outside devices and at least one device within the range ("inside device") are configured as repeaters, so that instructions from the automation controller 12 may reach the outside devices. In other embodiments, the outside devices are associated with the inside device and may be considered as attributes of the inside device. In this scenario, a controller, 12 or 14, sends a command to the inside device associated with the outside devices, which is then implemented on the outside devices at the appropriate time by the inside device.

The means in which the information is provided to and from the outside devices 16 may or may not be the same as the means in which the information was provided from the controllers, 12 or 14, to the peripheral device $16_1$ in the range. For example, if the outside devices are electrically connected, then externally powered devices using power line communications between outside devices may be appropriate, while wireless communications may be used for communications between the controller 12 or 14 and the peripheral device $16_1$. In other applications, outside devices may have diverse functions, such as outside lighting, contact switches on gates and mailboxes, and sensors, it may be more easily implemented using battery powered devices and the same wireless communications protocol as used in within the range of the automation controller 12. In still other embodiments, wireless communication may be provided by the automation controller 12 and the inside devices 16, whereas communication and power is provided to the outside devices via Ethernet.

Figure 4B:
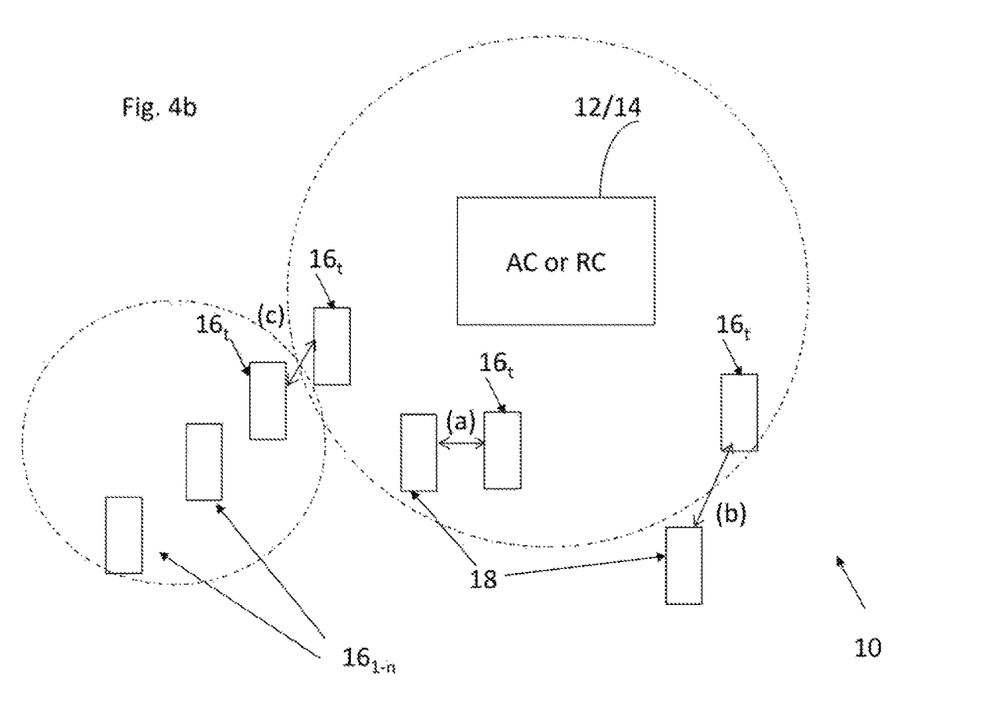

FIG. 4b shows another embodiment of the present invention including a peripheral device $16_t$ that is configured to translate a message from the protocol used by the automation controller 12 to the protocol used by one or more secondary devices 18, which may be inside, shown as (a) in FIG. 4b, or outside (b) the coverage range of the automation controller 12. The translation may be between wireless protocols and/or wireline protocols and implemented in a variety of ways, such as mapping the signal from one protocol to another or by embedding one protocol signal within the other protocol signal, similar to a digital wrapper. For example, the peripheral device $16_t$ may translate a Zigbee protocol signal to an RS-485 signal to communicate with components in an HVAC system. The RS-485 link may be implemented as a full duplex, 4 wire solution or half-duplex 2 wire solution depending upon conditions, e.g., multiple radio interference conditions, and the amount and frequency of information being communicated through the link. In addition, two translator peripheral devices $16_t$ may be used to set up a link (c) using a different protocol, while still communicating with other devices using the protocol of the automation controller 12. In this implementation, this translator devices $16_t$ may be used to convert from wireless to wired protocols (in this example Zigbee and RS-485) to enable the signal to reach an area more easily accessed using a wired protocol, but where the signal may be sent wirelessly within the area. In this example, the translator device $16_t$ may be operated in a mode where the Zigbee message is inserted untouched into an RS-485 stream, which is sent to a second translator device $16_t$, where it is received. The 485 stream is analyzed and a Zigbee message is recreated by the second translator device $16t$ and sent to the destination peripheral device 16.

One of ordinary skill in the art will appreciate further that the range of an automation controller 12 may also be extended via repeater peripheral devices 16, which are used to amplify, typically be receiving and retransmitting signals, without altering the signals. Range extenders are known in the art and commonly available in 802.11 architectures. Of course, the repeater functionality may be embedded in other peripheral devices 16 to eliminate the expense of deploying stand-alone repeater devices.

Figure 5A:
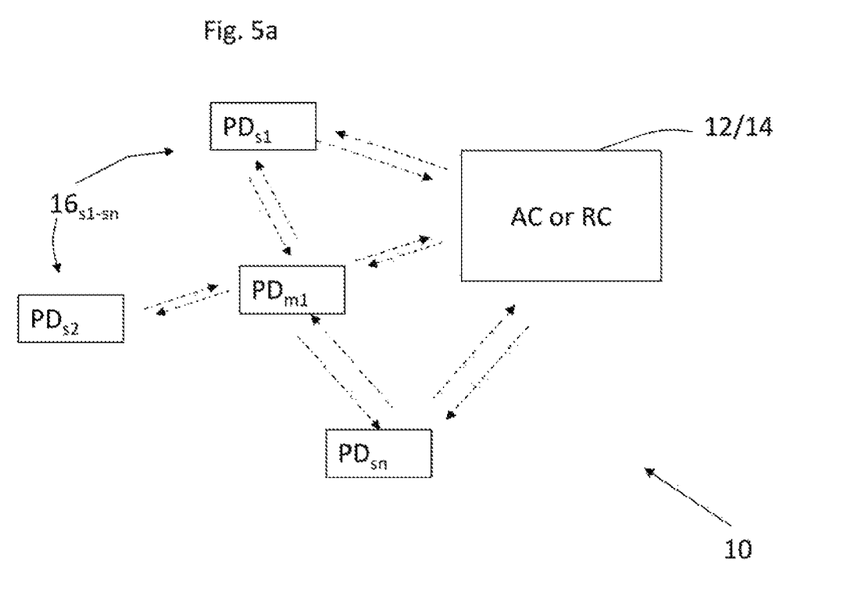

FIG. 5a shows embodiments of the system 10 including mobile peripheral devices $16'''$, which may be implemented to provide additional functionality to the system 10. Peripheral devices 16 that are fixed in space for a particular application may be referred to as stationary peripheral devices 16 to facilitate description. However, whether a peripheral device 16 is considered stationary or mobile may, in fact, depend upon the specific application and/or system configuration implemented by the user.

In the present invention, the mobile device $16'''$ may be used for determining when a subject (person, pet, object, etc.) leaves or enters a structure or zone. In these embodiments, a peripheral device 16 may be attached, via bracelet, anklet, collar, or otherwise, to the subject and its transmission may be used to determine when the subject has left the zone, passes through a reception area or proximate to another device, etc. Mobile peripheral devices $16'''$ may be applied to home, office, or construction areas for theft protection and safety measures as well.

The system may be configured to geolocate the mobile peripheral devices $16m$ operating in an environment with two or more other peripheral devices 16. For example, the received signal strength from various receivers may be used to locate the device by determining vectors for triangulation. This application allows the system 10 to determine, not only when a subject has left a zone, but also, with some accuracy, where the transmitting device attached to the subject is located within the zone. This level of geo-location may be either constantly updated, or determined by querying the receivers in the zone. It will be appreciated that the system may determine the general location of the mobile device within the range of the system 10. The precision of the mobile device location may depend upon the desired amount and precision of the information received by the controller 12 from various stationary peripheral devices 16.

The frequency at which the system 10 tracks the mobile peripheral devices 16 may be configured by the user depending upon a desired implementation of the devices. For example, it may be desirable for the mobile peripheral devices 16 to transmit a signal, when it is prompted manually by remote controller 14 and/or automation controller 12. In these scenarios, the user may want only want to know the location when they are looking for the object, such as a remote controller 14, car keys, or even a pet. The automation controller 12 may be configured to request signals from the mobile peripheral devices $16'''$ at different intervals depending upon the location of the mobile peripheral devices $16'''$ within the system range.

In other instances, the user may want to know as soon as possible, or practical, that a child or disabled adult has left the range of the system 10. In these instances, the frequency and extent of the transmission must be balanced against the battery life of the device. In various embodiments, the mobile peripheral devices 16 may be driven by kinetic energy. An energy storage device, such as a rechargeable battery or capacitors may be provided to store excess kinetic energy. The kinetic energy driven device 16 has the benefit in that the energy to transmit signals is being generated by the motion of the object to which the mobile device $16'''$ is attached, which is precisely when the energy is needed for transmission. When the object is at rest and no kinetic energy is being generated, the transmission frequency may be much less, because the object is stationary and its location is presumably known.

In still other embodiments, the mobile device $16'''$ may lay dormant, i.e., not transmit a signal on its own, unless it is requested by an automation controller 12 or remote controller 14, or is activated/triggered by, or activates, another device in the system. For example, the mobile device $16m$ may include an electromagnetic wave (e.g., RF, IR, etc.) detector and/or emitter/tag. In the case of a detector, when the device comes within the range of an emitter, which may be located proximate the exit of buildings, premises, room, or otherwise, the mobile device $16'''$ would be activated by the emitter signal from the emitter and begin transmitting signals to identify its location. If the mobile device $16'''$ includes an RF emitter, a RF detector located near a threshold of interest may be used to send a signal to the automation controller 12 that it has detected a mobile device emitter, at which time the automation controller 12 may ping the mobile device $16'''$ to send a tracking, or location, signal and/or other information that may be used by the controller to track the mobile device $16'''$.

In various embodiments, such as those involving disabled adults and children, the mobile device $16'''$ may be regularly polled by the automation controller 12 and may be activated by, or activate, another device that is used to monitor the movement of the individual near thresholds of interest, building exits, etc. In this manner, regular updates may be obtained when a person is within a known area and the frequency of updates may be accelerated and notifications made, when a person leaves an area. It will be appreciated that the mobile device $16'''$ may perform a number of functions, such as measuring temperature, shock, pulse, etc. (i.e., health parameters) for individuals, in addition, to providing a tracking signal.

In application, when the automation controller 12 determines that an object being tracked with a mobile device $16'''$ has left some predefined area, such as exiting a building, the automation controller 12 may be configured to communicate the information to the user by the available means, such as email, text message, phone call, audible signal, etc. or merely log the time that object left the predefined range. The automation controller 12 may take the same or a different action when the object wearing the mobile device reenters the predefined range. An example of the automation controller 12 merely logging information may be logging when object that normally are expected to exit and reenter a range are being tracked, such as vehicles at a dealership or personnel at an office during normal business hours. Extending these same examples, the user may want to be notified when these objects enter and exit the premise during non-normal business hours.

Peripheral devices 16 may be deployed in data collection modes, if sufficient memory is provided for data storage during the collection interval, instead of transmitting the data as it is collected. The device 16 would then transmit the data collected over the interval to the controller or a display. For example, various sensors may be deployed that log data for periodic review and/or transmission, in lieu of regularly transmitting the data or waiting for a request by a controller.

The device 16 also may collect data on a fixed interval, but only transmit data when a threshold has been exceeded, such as high/low temperature, shock, gas concentration, humidity, etc., or upon request. Alternatively, the peripheral device 16 may perform some processing of the raw data and transmit only the processed data, while perhaps retaining the raw data for a period of time to allow for retrieval if necessary. For example, the peripheral devices 16 may process the raw data and transmit a moving average of the data and any extreme outliers to the data. In this manner, communication traffic in the system 10 is reduced.

Figure 5B:
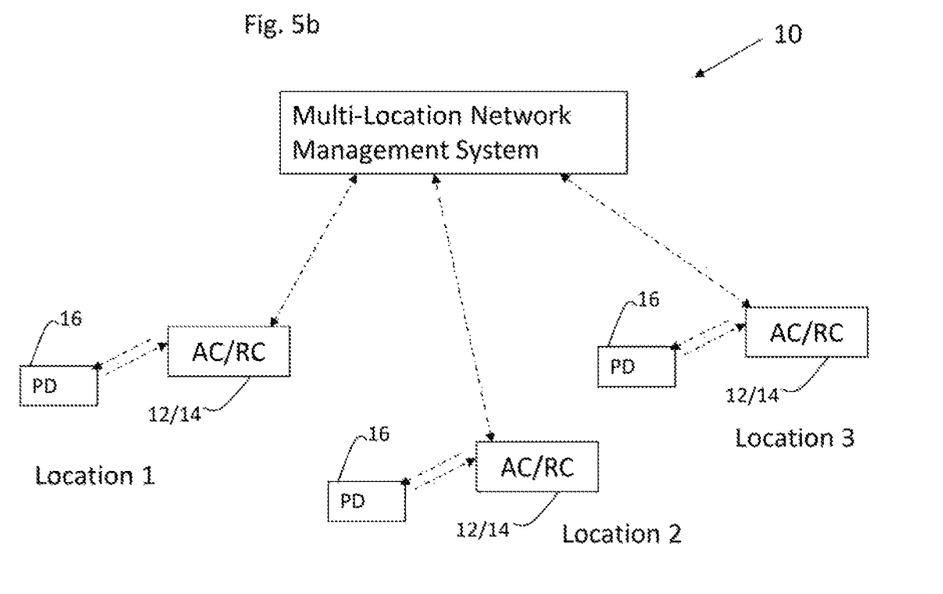

As shown in FIG. 5b, devices 16 that are configured to collect data for later access also may be deployed in embodiments, in which two systems 10, or sub-systems of a larger system, are employed having non-overlapping ranges including geographically diverse configurations. For example, a device 16 that includes one or more sensors for detecting relevant conditions may be provided on the inside and/or outside of a shipping container. The data on the device 16 may be read before shipment by a system 10 at the point of origin and by a counterpart system 10 at the destination to determine the conditions to which the contents of the shipping container were exposed. It may also be possible to read the data en route. If the device 16 is provided within a sealed container, the data collected may be used to verify that a container was not exposed to conditions, temperature, humidity, shock, etc., that may damage the contents and the point in time and duration of the exposure to extreme conditions. The number of devices 16 deployed within a container and the sensors or other instruments included in or associated with the device 16 may generally depend upon the size of the container, (e.g., letter size package, cargo ship container) and the desire for redundant data collection, which may depend upon the value of the contents of the container. In practice, the carrier may be present and confirm the origin and destination data and the shipper/user may implement sufficient security, such that the device 16 is not reset or data compromised during shipment.

From a tracking perspective, the devices 16 used for shipping may be treated statically or as a mobile device 16''' by the system 10. For example, the shipping devices may be detected before or after the device enters a facility to provide data on whether shipments should be rejected, inspected, and/or accepted from a carrier. In other embodiments, each of the geographically diverse systems 10 may be included in a broader overall system from a network management level, such that peripheral devices 16 in each of the local systems may be registered and status maintained in an overall database, such that when the peripheral device 16 re-enters the coverage area of one of the system 10, it may be detected and the data logged. The overall database may be enabled in various configurations by one of ordinary skill. For example, the overall database for the plurality of systems, or automation controllers 12, may be embodied in a multi-level automation controller architecture, in which a master controller provides at least some control over multiple automation controllers 12 or the overall database may be merely a shared database that is accessible by multiple systems.

Figure 6:
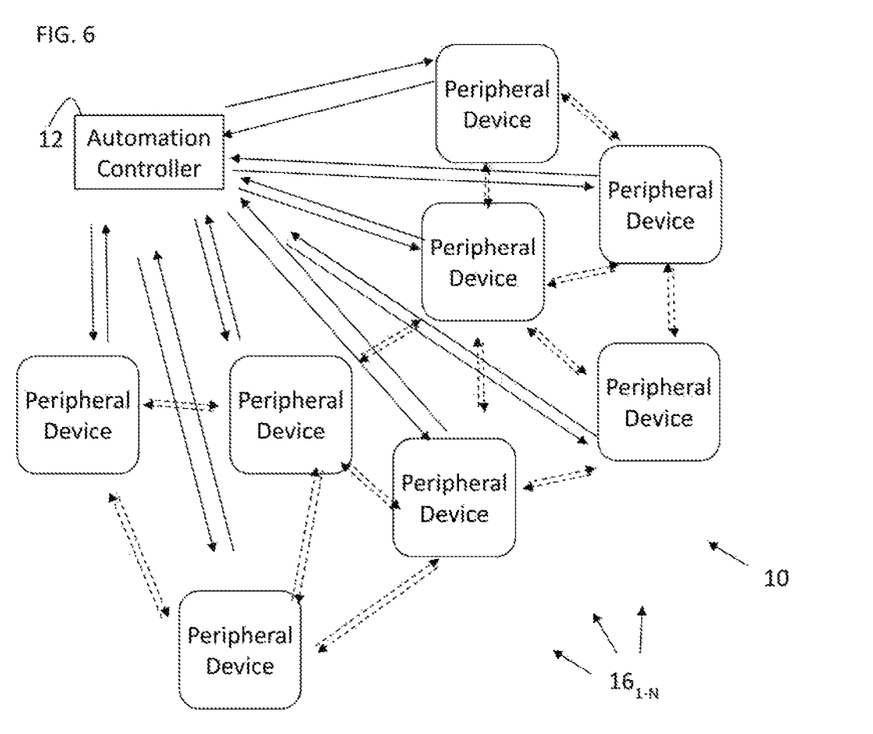

In various deployments of the present invention, it may be desirable to disable repeater functionality on various peripheral devices 16, such as in FIG. 6, which may enable those devices to perform the assigned function in the system. In FIG. 6, direct communication between a peripheral device 16 and the automation controller 12 is shown by solid lines. Repeater functionality (receiving and retransmitting communication signals being transmitted to and/or from other peripheral devices) is shown as dashed lines between the peripheral devices 16.

The disabling of repeater functionality may be performed on a number of bases as decided by the skilled artisan. For example, if a particular device or device class is particularly consumed performing its system function, e.g., controlling a thermostat, dimming lights, processing sensor data, then repeater functionality may be disabled on those devices.

In various embodiments, the automation controller 12 may survey the architecture of the network and make determinations to disable repeater functionality on various peripheral devices 16 in the network. In various scenarios, such as FIG. 6, if the automation controller 12 may communicate directly with all of the peripheral devices 16, or nodes, in the network, the automation controller 12 may issue a command to some or all of the peripheral devices 16 to disable the repeater functionality. In those instances, the system 10 may convert itself from a mesh network to a spoke and hub network and variations thereof. During operation, the automation controller 12 may make network adjustments to accommodate changes in network performance, which may produce a different network topology. If the automation controller 12 is no longer communicating with a peripheral device 16, the automation controller 12 may issue a find command requesting the peripheral devices 16 to listen to network traffic for the non-communicating device and repeat if detected or to enable repeater functionality, as further discussed below.

In some embodiments, some peripheral devices 16 have repeating enabled, while other are disabled, as a means to limit the amount of traffic repeated on the network. Various algorithms may be employed to determine the repeat enable/disable pattern in the network.

The system 10 may be partitioned at the network level to manage the network traffic. In various embodiments, peripheral devices 16 that serve as dedicated network nodes are added in the system 10. The dedicated network node may perform a single function, such as serving as a repeater in the network, or a limited set of network functions. When a dedicated network node is introduced into the system 10 to serve as a repeater, then peripheral devices 16 proximate to the dedicated network node may have their repeater functionality disabled. The dedicated repeating network nodes may be used to partition the communication network of a deployed system 10 by providing an expressway into one or more subnetworks in the system 10. In some embodiments, the dedicated network nodes may be used to provide a fully partitioned communication network layer where traffic is only repeated by the network nodes and repeater functionality is disabled on the other peripheral devices 16 in the system 10. In other embodiments, the dedicated network nodes may be used to reduce the traffic volume in parts of the network. For example, network nodes may be added where the network is particularly dense and repeater functionality may unnecessarily increase the communication traffic volume in that portion of the network.

By introducing network nodes in the system 10 and disabling the repeater functionality in other peripheral devices 16 proximate to the network node, the skilled artisan may effectively depopulate a portion of the network and improve the performance of the network. This application of network nodes is counter to traditional deployment of dedicated network nodes, which is to increase the density of the network by adding repeater nodes to the system 10.

In various embodiments, the automation system 10 may include an automation controller 12 and a plurality of peripheral devices $16_{1-N}$ configured to perform a building control-management function. The automation controller and peripheral devices communicate wirelessly and the peripheral devices may be enabled and disabled as wireless repeaters in a network formed by the automation controller and the peripheral devices. One or more peripheral device may be enabled or disabled as a wireless repeater. As previously mentioned, the system 10 may also include peripheral devices that communicate with the automation controller via a wire. The automation controller 12 may monitor the communication traffic levels in the wireless network and enable or disable peripheral devices as wireless repeaters to increase or decrease the communication traffic in the network.

In some instances, it may be desirable for the automation controller to disable temporarily a portion of the peripheral devices as wireless repeaters for various reasons. For example, a general command may be issued over a network that might result in a large traffic burst, if every peripheral device 16 is enabled as a wireless repeater. A silence command may be issued via the automation controller to disable at least a portion of the peripheral devices as wireless repeaters for a period of time. Conversely, a find command may be issued via the automation controller to enable peripheral device as wireless repeaters for at least a period of time when at least one other peripheral device is not wirelessly communicating with the automation controller. The find command may leave the peripheral devices 16 enabled or disabled after the missing peripheral device is found or after a period of time.

In various embodiments, delayed on-demand commands may be issued via the automation controller 12 to enable a plurality of peripheral devices 16 to perform one or more functions with at least one time delay period from the issuance of the command by the automation controller 12. For example, a group of peripheral devices 16 may be used to control lighting and be time synchronized. The automation controller may issue a command to turn on 3 seconds from the time of this command. Delayed commands may be used with schedules, sensor-driven actions, e.g., occupancy, temperature, and on-demand/override commands. Delayed on-demand commands enable the system to manage the roll-out of the action being taken. For example, it may desirable to have all of the lights in an area change lighting levels at the same time. However, depending upon the type of network deployed, the activity in the devices, and communications traffic in the network, the command to change lighting levels may not reach all devices 16 within a small enough time frame for the light levels to change at the same time. The delayed on-demand time period may be set to make it much more likely that all of the devices have received the command to execute ahead of the time for the devices to execute the command.

In some instances, it is known that the issuance of a command in the system 10 may generate a flurry of communication traffic that is not desired. The delayed on-demand command may give the system time to issue another command, such as silence for a period of time, to prevent the traffic flurry from occurring. For example, it is desired that a first group of lights be turned on at the same time, followed by a second group of lights. The delayed on-demand commands may be used to stage the turn on of the two groups of lights, as well as manage the communication traffic flurry resulting from the commands.

These and other variations and modifications of the present invention are possible and contemplated, and it is intended that the foregoing specification and the following claims cover such modifications and variations.

What is claimed is:

1. A system, comprising:
   an automation controller; and,
   a plurality of peripheral devices to perform building control functions, where,
   the automation controller and the plurality of the peripheral devices communicate wirelessly forming a wireless communication network,
   the automation controller configured to enable and disable the plurality of peripheral devices as wireless repeaters,
   wireless repeaters receiving and retransmitting signals from other peripheral devices in the network, in addition to communicating wirelessly with the automation controller, and where
   the automation controller
   enables the peripheral devices as wireless repeaters,
   monitors communication traffic through the wireless communication network,
   determines whether the automation controller is in communication with all of the peripheral devices, and,
   disables peripheral devices as wireless repeaters selectively to limit communication traffic in the wireless communication network, while ensuring the automation controller maintains communication with all of the peripheral devices.

2. The system of claim 1, where the automation controller issues a delayed on-demand command to enable a plurality of peripheral devices to perform a function delayed from issuance of the delayed on-demand command by the automation controller.

3. The system of claim 1, where the automation controller disables peripheral devices as wireless repeaters to decrease communication traffic.

4. The system of claim 1, where the automation controller disables peripheral devices as wireless repeaters to limit communication traffic in the wireless communication network based on at least one of network performance and peripheral system utilization.

5. The system of claim 1, where the peripheral devices include a dedicated network node that serves one function as a wireless repeater.

6. The system of claim 1, where the automation controller determines when one of the peripheral devices is no longer in communication with the automation controller; and enables one or more peripheral devices as wireless repeaters until the automation controller is in communication with all of the peripheral devices.

7. A method comprising:
forming, by an automation controller and peripheral devices performing automation functions, a wireless communication network;
the automation controller communicating wirelessly with the peripheral device;
the peripheral devices configured to be enabled and disabled as wireless repeaters,
wireless repeaters being configured to receive and retransmit signals from other peripheral devices in addition to communicating wirelessly with the automation controller,
disabling, by the automation controller, the peripheral devices as wireless repeaters;
monitoring, by the automation controller, communications from the peripheral devices;
determining, by the automation controller and based on the monitored communications, whether the automation controller is communicating with all of the peripheral devices; and,
enabling, by the automation controller, peripheral devices as wireless repeaters selectively until the automation controller maintains communication with all of the peripheral devices.

8. The method of claim 7, further comprising:
issuing a delayed on-demand command via the automation controller to enable a plurality of peripheral devices to perform a function delayed from issuance of the delayed on-demand command by the automation controller.

9. The method of claim 7, further comprising:
enabling the peripheral devices as wireless repeaters;
monitoring communication traffic through the wireless communication network;
determining whether the automation controller is in communication with all of the peripheral devices; and,
disabling peripheral devices as wireless repeaters selectively to limit communication traffic in the wireless communication network, while ensuring automation controller maintains communication with all of the peripheral devices.

10. The method of claim 9, wherein said disabling including disabling peripheral devices as wireless repeaters to decrease communication traffic.

11. The method of claim 9, wherein disabling peripheral devices as wireless repeaters to limit communication traffic in the wireless communication network based on at least one of network performance and peripheral system utilization.

12. The method of claim 7, further comprising:
adding a peripheral device as a dedicated network node that serves one function as a wireless repeater.

13. The method of claim 7, where the automation controller is to:
determine when one of the peripheral devices is no longer in communication with the automation controller; and
enable one or more peripheral devices as wireless repeaters until the automation controller is in communication with all of the peripheral devices.

14. A non-transitory computer readable medium storing instructions, the instructions comprising:
one or more instructions which, when executed by one or more processors, cause the one or more processors to:
form, by an automation controller and peripheral devices performing automation functions, a wireless communication network;
the automation controller communicating wirelessly with the peripheral device;
the peripheral devices configured to be enabled and disabled as wireless repeaters,
wireless repeaters being configured to receive and retransmit signals from other peripheral devices in addition to communicating wirelessly with the automation controller,
disable the peripheral devices as wireless repeaters;
monitor communications from the peripheral devices;
determine, based on the monitored communications, whether the automation controller is communicating with all of the peripheral devices; and,
enable peripheral devices as wireless repeaters selectively until the automation controller maintains communication with all of the peripheral devices.

15. The non-transitory computer readable medium of claim 14, where the one or more instructions, when executed by the one or more processors, further cause the one or more processors to:
issue a delayed on-demand command via the automation controller to enable a plurality of peripheral devices to perform a function delayed from issuance of the delayed on-demand command by the automation controller.

16. The non-transitory computer readable medium of claim 14, where the one or more instructions, when executed by the one or more processors, further cause the one or more processors to:
enable the peripheral devices as wireless repeaters;
monitor communication traffic through the wireless communication network;
determine whether the automation controller is in communication with all of the peripheral devices; and,
disable peripheral devices as wireless repeaters selectively to limit communication traffic in the wireless communication network, while ensuring automation controller maintains communication with all of the peripheral devices.

17. The non-transitory computer readable medium of claim 16, where the one or more instructions, that cause the one or more processors to disable peripheral devices, cause the one or more processors to:
disable peripheral devices as wireless repeaters to decrease communication traffic.

18. The non-transitory computer readable medium of claim 16, where the one or more instructions, that cause the one or more processors to disable wireless repeaters, cause the one or more processors to:
disable peripheral devices as wireless repeaters to limit communication traffic in the wireless communication network based on at least one of network performance and peripheral system utilization.

19. The non-transitory computer readable medium of claim 14, where the one or more instructions, when executed by the one or more processors, further cause the one or more processors to:
determine when one of the peripheral devices is no longer in communication with the automation controller; and
enable one or more peripheral devices as wireless repeaters until the automation controller is in communication with all of the peripheral devices.

* * * * *